United States Patent [19]

Mochizuki

[11] Patent Number: 5,055,980
[45] Date of Patent: Oct. 8, 1991

[54] AUTOMOBILE HEADLAMP

[75] Inventor: Hideharu Mochizuki, Shizuoka, Japan

[73] Assignee: Koito Manufacturing Co., Ltd., Tokyo, Japan

[21] Appl. No.: 666,936

[22] Filed: Mar. 11, 1991

[30] Foreign Application Priority Data

Mar. 27, 1990 [JP] Japan .................................. 2-75766

[51] Int. Cl.$^5$ ............................................. B60Q 1/04
[52] U.S. Cl. ...................................... 362/61; 33/288;
362/66; 362/101; 362/226; 362/269
[58] Field of Search .......................... 33/288, 370, 376;
362/61, 80, 66, 101, 226, 253, 269, 285

[56] References Cited

U.S. PATENT DOCUMENTS

| | | | |
|---|---|---|---|
| 4,802,067 | 1/1989 | Ryder et al. | 362/61 |
| 4,916,583 | 4/1990 | Nagasawa | 362/61 |
| 4,922,387 | 5/1990 | Ryder et al. | 362/61 |
| 4,970,629 | 11/1990 | McMahan | 362/61 |

Primary Examiner—Stephen F. Husar
Attorney, Agent, or Firm—Sughrue, Mion, Zinn, Macpeak & Seas

[57] ABSTRACT

An automobile headlamp wherein a level for measuring the tilt of the illumination angle of the headlamp in the up/down direction is attached to a horizontally extending portion of a socket fixture attached in a bulb insertion hole of a tiltable reflector or lamp body so as to extend toward the back of the lamp. The conventionally required level-mounting space on the upper portion of the headlamp is therefor not required, and hence the height of lamp in the up/down direction can be reduced and the headlamp made thin.

13 Claims, 7 Drawing Sheets

AUTOMOBILE HEADLAMP

BACKGROUND OF THE INVENTION

The present invention relates to an automobile headlamp having a level for confirming whether the illumination angle of the headlamp in the up/down direction is proper or not. More particularly, the invention relates to an automobile headlamp in which the illumination angle of the headlamp can be easily adjusted when the illumination angle is not proper.

In a conventional headlamp, such as those disclosed in U.S. Pats. Nos. 4,794,495 and 4,802,067, a level constituted by a bubble vial is attached at a predetermined position on the upper surface of a lamp body reflector unit having an inner surface on which a reflector is formed. The horizontal position of the level is made to coincide with the illumination axis of the headlamp. Thus, the illumination angle of the headlamp in the up/down direction can be adjusted by means of aiming mechanism while the scale of the level is observed.

However, in a thin headlamp, that is, a headlamp which is low in height in the vertical direction, there is a problem in that a level attached to the lamp at its upper portion is an impediment to reducing the vertical height of the lamp.

Figures 9, 10:
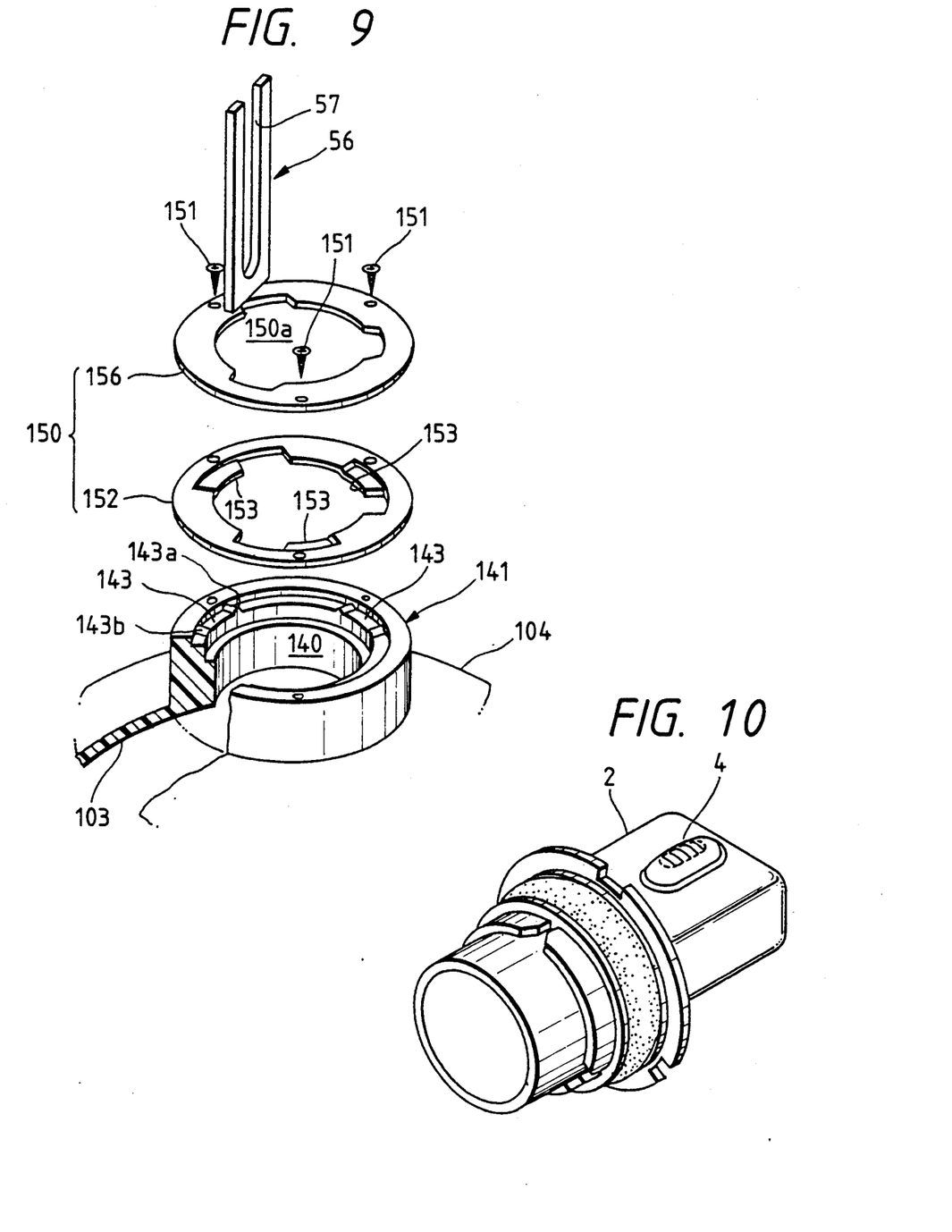
FIG. 9 is an exploded perspective view of the circumference of a bulb insertion hole.
FIG. 10 is a perspective view showing a conventional headlamp.

In a headlamp as disclosed in commonly assigned U.S. patent application, Ser. No. 07/370,949, filed on June 23, 1989 and as shown in FIG. 10 herein, a level 4 is integrally attached to a bulb socket 2 to measure the tilt angle of the headlamp in the up/down direction. In this approach, however, there has been a problem in that, since the bulb socket 2 and the level 4 are formed integrally with each other, when the bulb is replaced, the level must be thrown away with the bulb, resulting in high cost.

SUMMARY OF THE INVENTION

The present invention has been attained in view of the above problems in the prior art, and an object thereof is to provide an automobile headlamp having a level for measuring the amount of deviation of the illumination angle of the lamp in the up/down direction wherein the level is mounted behind a reference member of the lamp. With this arrangement, the lamp can be made thin.

Further, another object of the present invention is to provide an automobile headlamp with a level in which the level need not be thrown away when replacing the bulb and which is not expensive in cost.

In order to attain the above and other objects, an automobile headlamp of the tilting-member type is provided in which the illumination angle of the headlamp can be adjusted by adjusting the tilt angle of a tilting member in the up/down direction and in the left/right direction with respect to a reference member, a socket fixture holding a bulb socket portion is attached in a bulb insertion hole of the tilting member, a plate-like rearwardly projecting horizontally extending portion is formed on the socket fixture, and a level for measuring the deviation angle of the tilting member in the up/down direction is attached to the horizontally extending portion.

The invention may be applied to a movable-reflector type headlamp in which the reference member is the lamp body and the tilting member is a reflector tiltably mounted in the lamp body.

Also, the invention may be applied to a unit-movable type headlamp in which the reference member is the lamp housing, and the tilting member is a lamp body reflector unit with a reflector integrally formed on the inner surface of the unit.

The level for measuring the amount of tilt of the tilting member in the up/down direction, that is, for measuring the amount of deviation of the illumination angle of the headlamp in the up/down direction from the desired angle, is attached to the horizontally extending portion of the socket fixture attached in the bulb insertion hole. In this arrangement, the conventionally required level-attaching space on the upper portion of the lamp becomes unnecessary, and hence the lamp can be made low in height.

Further, the socket fixture to which the level is attached is a part completely independently of and separated from the bulb, so that when the bulb is replaced, only the bulb is thrown away, and it is unnecessary to discard the socket fixture and the level.

DESCRIPTION OF THE PREFERRED EMBODIMENTS

Referring to the drawings, preferred embodiments of the present invention will be described.

Figure 1:
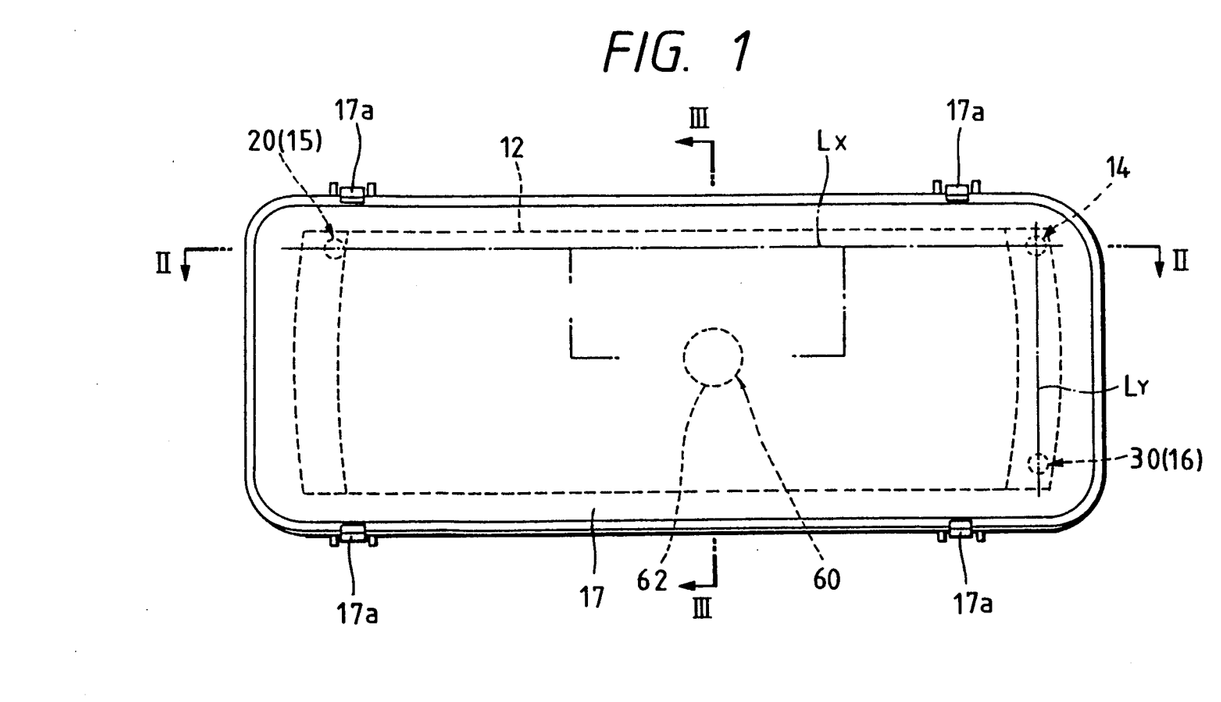
FIG. 1 is a front view of a preferred embodiment of a headlamp of the invention applied to a movable-reflector type headlamp.
Figure 2:
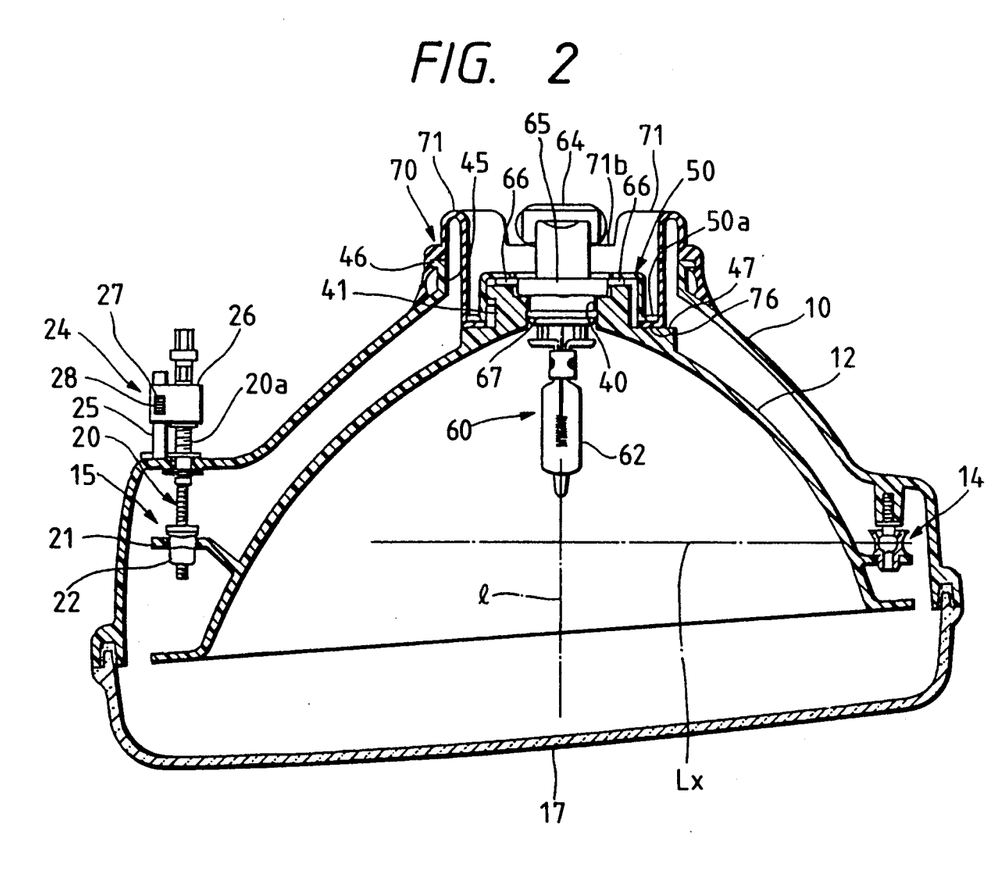
FIG. 2 is a horizontal sectional view of the headlamp taken on a line II—II in FIG. 1.
Figure 3:
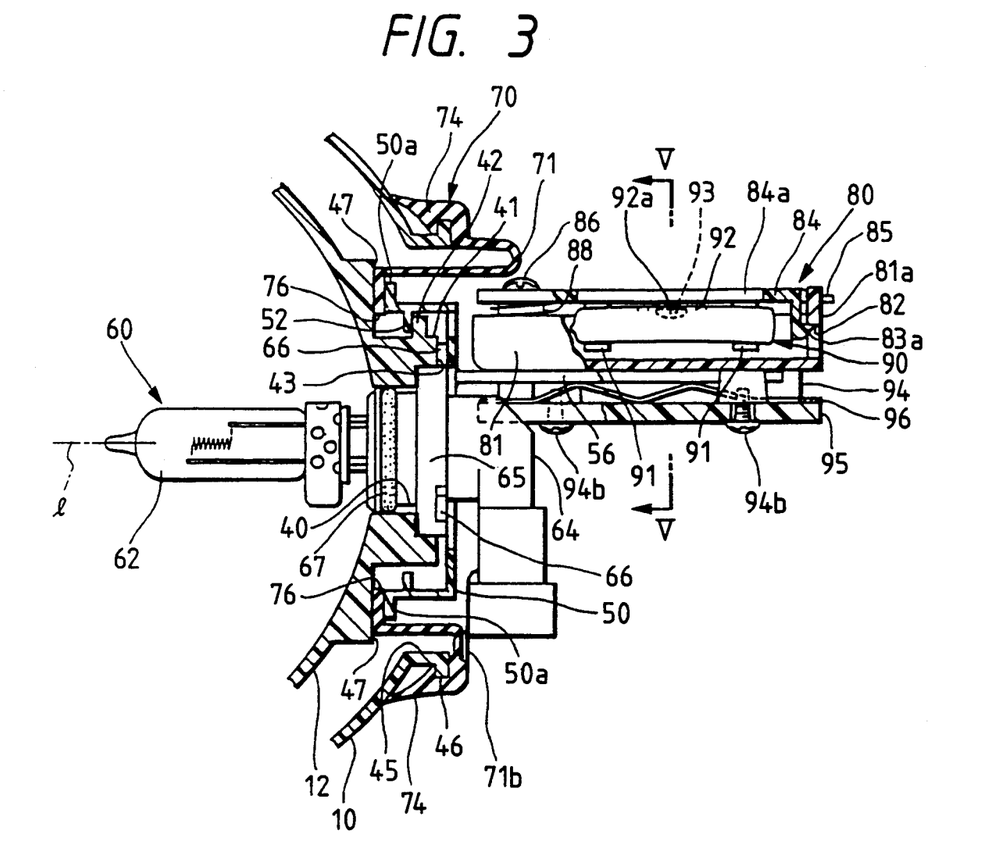
FIG. 3 is am enlarged vertical sectional view of the headlamp taken on a line III—III in FIG. 1.
Figure 4:
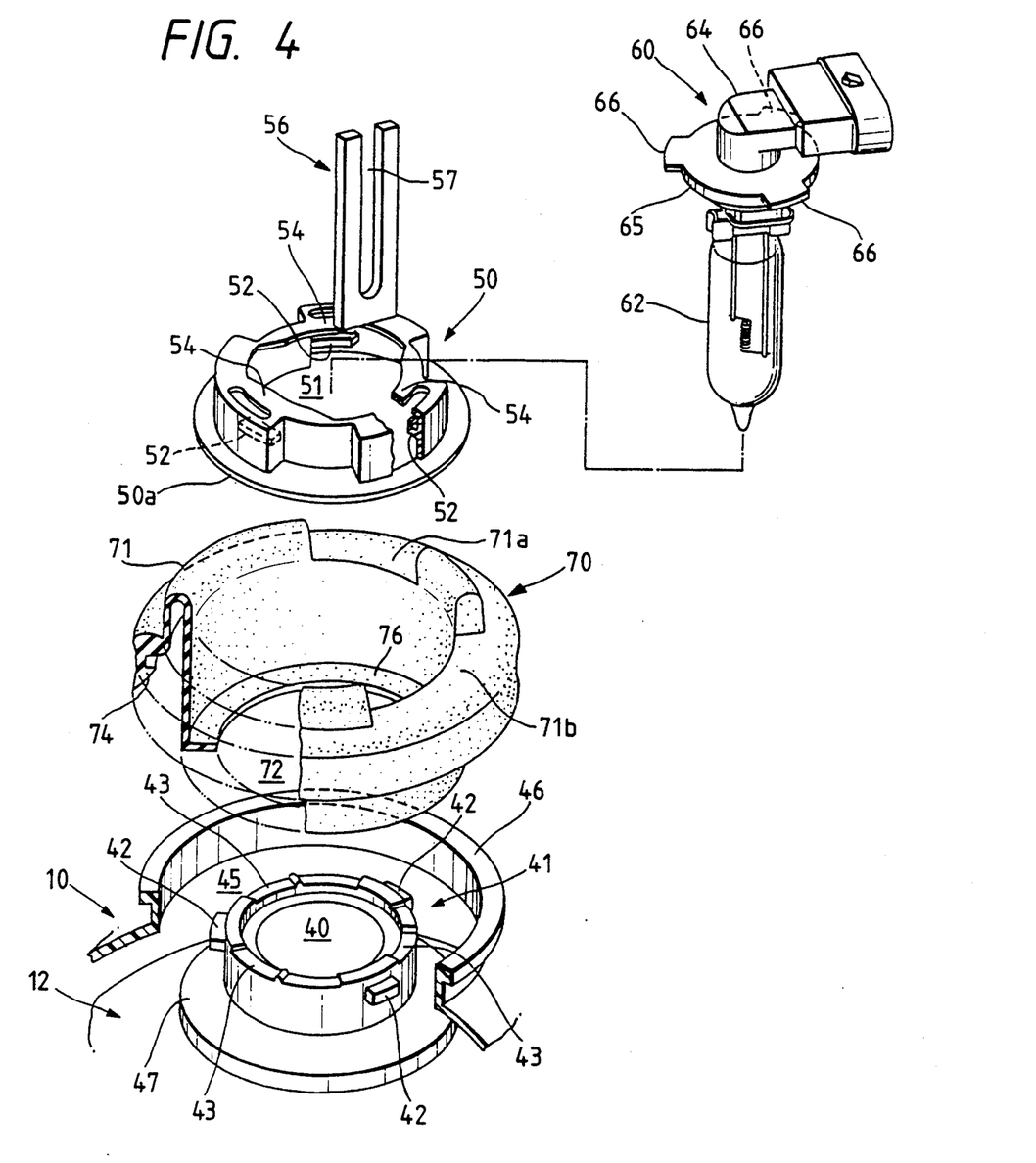
FIG. 4 is an exploded perspective view of the circumference of a bulb insertion hole.
Figure 5:
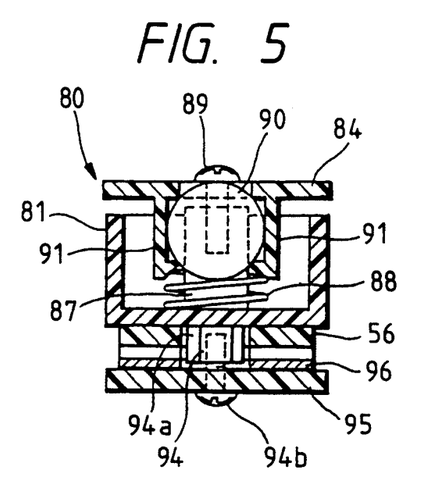
FIG. 5 is a transverse sectional view of a level taken on a line V—V in FIG. 3.
Figure 6:
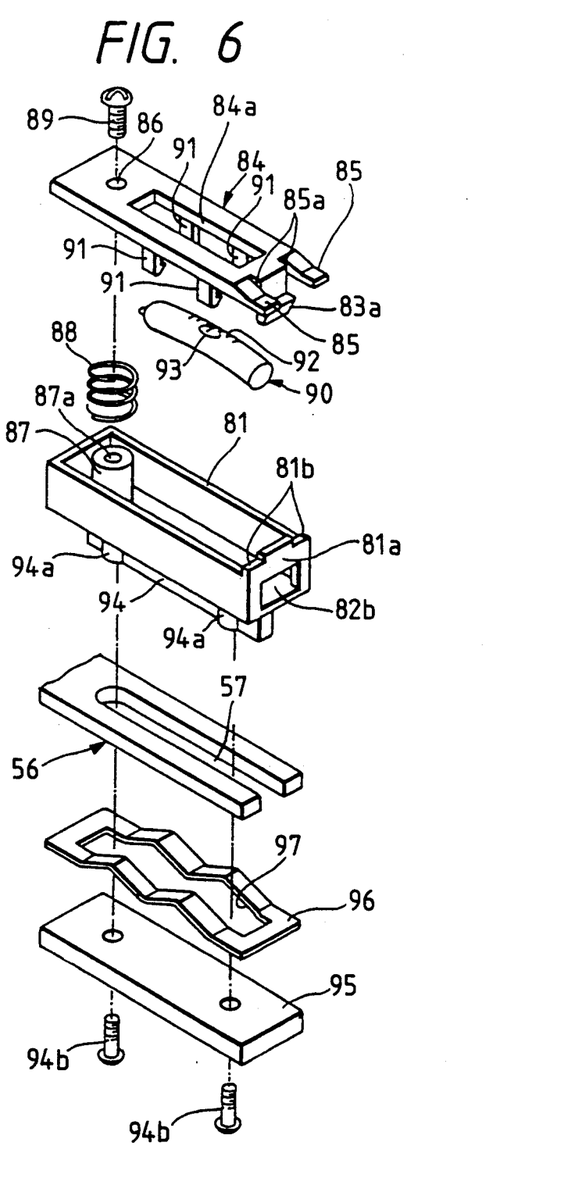
FIG. 6 is an exploded perspective view of the level.
Figure 7:
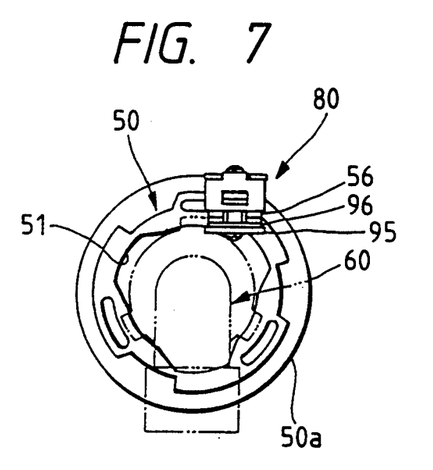
FIG. 7 is a front view of a socket fixture.

FIGS. 1 through 7 show an embodiment in which the present invention is applied to a movable-reflector type headlamp in which the reference member is the lamp body and the tilting member is the reflector. FIG. 1 is a front view of the headlamp, FIG. 2 is a horizontal sectional view of the headlamp (a sectional view taken on a line II—II shown in FIG. 1), FIG. 3 is a vertical sectional view of the headlamp (an enlarged sectional view taken on a line III—III in FIG. 1), FIG. 4 is an exploded perspective view of the circumference of a bulb insertion hole, FIG. 5 is a cross sectional view of a level (a sectional view taken on a line V—V in FIG. 3), FIG. 6 is an exploded perspective view of the level, and FIG. 7 is a front view of a socket fixture (a view showing the socket fixture seen from the rear side of the lamp).

In the drawings, reference numeral 12 designates a parabolic reflector in which a bulb assembly 60 is inserted. The reflector 12 is supported in a vessel-like lamp body 10 at three points by a swinging fulcrum 14 having a ball joint structure and two aiming fulcrums, each constituted by an aiming screw and a nut. The reflector 12 is tiltably mounted so as to tilt around a horizontal axis $L_x$ passing through the leftward/rightward aiming fulcrum 15 and the swinging fulcrum 14 and a vertical axis $L_y$ passing through the upward/downward aiming fulcrum 16 and the swinging fulcrum 14.

Reference numeral 20 (FIG. 2) designates a leftward/rightward aiming screw, and reference numeral 30 (FIG. 3) designates an upward/downward aiming screw. The screws 20 and 30 penetrate the lamp body 12 in the front/rear direction so as to be supported by the lamp body 12. Reference numeral 22 designates a nut into which is screwed the aiming screw 20 and which is fittingly attached to a bracket 21 provided on the back side of the reflector 12 so as to project therefrom. Although not explicitly shown in the drawings, a nut into which the aiming screw 30 is screwed is fittingly attached to a bracket provided on the back side of the reflector so as to project therefrom. The nuts are moved forward/rearward along the screws 20 and 30 by rotating the aiming screws 20 and 30 so that the distance between each nut and the lamp body 10 which is the reference member of the aiming fulcrums 15 and 16 is shortened/extended and the reflector 12 is thereby tilted about the vertical axis $L_y$ and the horizontal axis $L_x$, respectively. Accordingly, the tilt angle of the reflector 12 in the left/right direction, and hence the tilt angle of the headlamp in the left/right direction, can be adjusted by the leftward/rightward aiming screw 20, while the tilt angle of the reflector 12 in the up/down direction, and hence the tilt angle of the headlamp in the up/down direction, can be adjusted by the upward/downward aiming screw 30.

A first tilt measuring device 24 for measuring the tilt of the reflector 12 in the left/right direction, that is, for measuring the displacement of the illumination angle of the headlamp in the left/right direction, is provided between the lamp body 10 and a lamp-body rearwardly projecting portion 20a of the leftward/rightward aiming screw 20. The measuring device 24 is constituted by a guide member 25 fixed to the lamp body 10 and extending parallel to the aiming screw 20, and a slide member 26 threadedly joined with a male screw portion formed at the rearwardly projecting portion 20a of the aiming screw 20 and combined with the guide member 25, so that the slide member 26 is slid forward/rearward along the guide member 25 by the rotation of the aiming screw 20.

A scale 27 is formed on the guide member 25. If the zero point of the scale 27 is set at a reference point 28 on the slide member 26 side when the position of the reflector 12 in the left/right direction, that is, the illumination angle of the headlamp in the left/right direction, is proper, then in the case where the reflector 12 is inclined in the left/right direction (in the case where the illumination angle of the headlamp in the left/right direction is not proper), the amount of such tilt is indicated by the amount of displacement of the scale 27. Accordingly, the degree of tilt of the illumination angle of the headlamp in the left/right direction is indicated by the amount of displacement of the scale (the scale indicated by the reference point 28). If the aiming screw 20 is rotated so as to make the displacement of the scale zero, the illumination angle of the lamp in the left/right direction will be properly adjusted.

Reference numeral 17 designates a front lens fitted over a front opening portion of the lamp body 10, and 17a designates clips for mechanically fastening the front lens 17 and the lamp body 10 to each other.

A bulb insertion hole 40 surrounded by a rearwardly projecting cylindrical protrusion 41 is formed in the reflector 12 at its rear top portion. The bulb assembly 60 is mounted in the bulb insertion hole 40 through a socket fixture 50. A bulb-access opening portion 45 having a circumference larger in size than that of the bulb insertion hole 40 of the reflector 12 is formed in the lamp body 10 at its rear top portion. A rubber cover 70 for closing the opening portion 45 is interposed between a circumferential edge portion 46 of the opening portion 45 and the rearwardly projecting portion 41 on the reflector 12 side.

The bulb assembly 60 is constituted by an electric bulb 62 and an L-shaped bulb socket portion 64 integrated with the electric lamp 62. Three flange-like protrusions 66 are provided on a focus ring 65 formed in the socket portion 64 so as to project therefrom. Reference numeral 67 designates a sealing ring provided on the outer circumference of the socket portion 64. When the bulb assembly 60 is mounted in the bulb insertion hole 40, the sealing ring 67 is urged against the bulb insertion hole 40 to thereby seal the bulb insertion hole 40.

On the top end portion of the rearwardly projecting portion 41 surrounding the bulb insertion hole 40 on the reflector side are formed horizontal engagement protrusions 42 for making bayonet-type engagement with the socket fixture 50 at three circumferentially equal-interval portions on the outer circumference of the socket fixture 50. In the top end surface of the protrusion 41 there are formed engagement concave portions 43 for engaging with respective ones of the flange-like protrusions 66 on the side of the bulb assembly 60.

As shown in FIG. 4, the socket fixture 50 is a flanged hat-shaped body made of synthetic-resin and having a generally triangularly shaped opening portion 51 formed in the upper surface of the socket fixture 50. Horizontal ribs 42 engageable with the horizontal engaging protrusions 42 on the reflector side are formed on the inner side wall of the socket fixture 50. When the socket fixture 50 is placed over the reflector-side projecting portion 41 and rotated clockwise, the horizontal ribs 52 on the socket fixture 50 side make bayonet-type engagement with respective ones of the horizontal engagement protrusions 42 so that the socket fixture 50 is firmly positioned in the up/down direction and in the circumferential direction. In the state in which the socket fixture 50 is mounted on the reflector-side projecting portion 41, gaps corresponding to the engagement concave portions 43 are formed between belt-like ribs 54 forming an upper surface and the top end surface of the reflector-side projecting portion 41, and flange-like protrusions 66 on the bulb side are caught in the gaps. That is, if the bulb assembly 60 inserted in the opening portion 51 of the socket fixture 50 is rotated clockwise, the flange-like protrusions 66 are fixed in position in the up/down direction and in the circumferential direction by the belt-like ribs 54 of the socket fixture 50 and the engagement concave portions 43 of the top end surface of the projecting portion 41. Further, a rearwardly projecting horizontally extending portion 56 is integrally formed on the upper surface of the socket fixture 50, and a level 80, which is a second measuring device for measuring the tilt of the reflector 12 in the up/down direction, is attached to the horizontally extending portion 56.

The level 80 is illustrated in detail in FIGS. 3 and 5 through 7. The level 80 has a structure in which a bubble vial 90, suspended by a cover body 84 made of an elastic synthetic resin such as U polymer, polyacetal, or the like, is housed in an upward-opening rectangular vessel-like casing 81 of synthetic resin and the level 80 is elastically attached to the horizontally extending portion 56 of the socket fixture 50 through a plate spring 96. The cover body 84 is fixedly attached to the casing 81 through convex-concave lance engagement by use of an adjusting screw 89. That is, a rectangular opening portion 82 is formed in a side wall 81a of the rear end of the casing 81, and a hook 83a projecting vertically downward so as to engage with the opening portion 82 on the casing side is formed on the rear end portion of the cover body 84. Further, a pair of hanging portions 85 extend from the rear end portion of the cover body 84 at the opposite side positions of the hook 83a through respective slits 85a. When the hook 83a is engaged with the opening portion 82 in the state in which the hanging portions 85 abut against the side-wall upper-end surfaces 81b of the casing rear end, the hanging portions 85 and the hook 83a are elastically transformed in opposite directions to each other in a cantilever-like manner so that the cover-body rear-end portion is prevented from coming off in the up/down direction and is supported elastically in the up/down direction. Thus, between the cover-body rear-end portion and the side wall 81a of the rear end of the casing there is formed a convex-concave lance elastic engagement portion constituted by the opening portion 82, the hook 83a, and the hanging portions 85 for preventing the cover-body rear end portion from coming off and elastically supporting the cover-body rear-end portion.

Further, a screw insertion hole 86 is formed in the front end portion of the cover body 84, and a boss portion 87 having a screw hole 87a therein projects from the bottom-surface front position of the casing 81. A compressed coil spring 88 is provided around the boss portion 87, and the front end portion of the cover body and the boss portion 87 are fastened to each other by an adjusting screw 89 in such a manner that the front end portion of the cover body is supported elastically in the up/down direction on the casing 81. By adjusting the adjustment screw 89, the tilt of the cover body 84, that is, the tilt of the bubble vial 90, and hence the position of the bubble in the vial, can be adjusted.

Further, the linear-type bubble vial 90 in which a bubble 93 is sealed is supported by sandwich portions 91 on the back side of the cover body 84, and the scale 92 formed on the surface of the bubble vial 90 is exposed through a rectangular window 84a formed at the central portion of the cover body. Reference numeral 92a designates the zero position on the scale. The sandwich portions 91 for sandwiching the bubble vial 90 are formed integrally with the cover body 83 so as to elastically grasp the outer circumferential curved surface of the bubble vial 90. Thus, with the bubble vial 90 supported in the casing 81 in a state in which the bubble vial 90 is suspended by the sandwich portions of the cover body 84, an adiabatic air layer is formed between the casing 81 and the bubble vial 90 so that little heat is transmitted from the casing side to the bubble vial 90 when the bulb is lit. In attaching the bubble vial 90 to the sandwich portions 91, the bubble vial 90 is inserted between the sandwich portions 91 from the top end side of the sandwich portions 91. Thus, the bubble vial 90 can be attached to the cover body 84 instantly.

A leg portion 94 having boss portions 94a thereon is formed on the casing 81 at its bottom-surface lower portion along the direction of extension of the casing, a fixing plate 95 is attached to the lower end portion of the leg portion 94 by attaching screws 94b, and a plate spring 96 is interposed between the casing bottom surface and the fixing plate 95. Reference numeral 97 designates an opening portion formed in the plate spring 96 and through which the leg portion 94 is inserted. The spring force of the plate spring 96 acts in the direction in which the casing bottom surface is pressed against the horizontally extending portion 56, and the horizontally extending portion 56 is sandwiched by the casing bottom surface and the plate spring 96, whereby the level 90 is attached to the horizontally extending portion. The spring pressure of the plate spring 96 can be adjusted by rotating the attaching screws 94b.

The horizontally extending portion 56 is forked, and the leg portion 94 on the level side is slidably inserted into the central slit 57 of the horizontally extending portion 56. That is, the cover body 84 supporting the bubble vial 90 is attached to the level casing 81, the plate spring 96 is provided on the leg portion 94, and the fixing plate 95 is fixed by screws so that those members are integrated as the level 80. Succeedingly, the forked horizontally extending portion 56 of the socket fixture 50 is inserted between the plate spring 96 and the bottom surface of the casing 81, whereby the horizontally extending portion 56 of the socket fixture 50 is integrally attached to the level 80. Thereafter, the socket fixture 50 integrated with the level 80 is mounted on the portion 41 projecting from the rear side of the reflector. Thus, if the previously integrally assembled level 80 is inserted into the horizontally extending portion 56 of the socket fixture 50, the level 80 can be easily integrally assembled with the socket fixture 50. When the socket fixture 50 integrally assembled with the level 80 has been mounted on the reflector rearwardly extending portion 41, the level 80 is in a horizontal state in which the level 80 is just parallel to the illumination axis 1 of the headlamp.

Thus, in this embodiment, the level 80 is previously integrally attached to the socket fixture 50 so that thereafter only the attachment of the socket fixture 50 is required to complete assembly. Hence, there is no requirement for independently attaching the level 80 to the reflector or for independently adjusting the horizontal position thereof.

Alternatively, the level 80 may be attached to the horizontally extending portion 56 of the socket fixture 50 after only the socket fixture 50 has been mounted on the rearwardly projecting portion 41 of the reflector 12. Even in this case, if the leg portion 92 of the level 80 is slidably inserted into the central slit 57 of the horizontally extending portion 56, the level 80 can be easily attached to the socket fixture 50.

Further, although the level 80 is attached to the horizontally extending portion 56 through the plate spring 96 in this embodiment, the structure may be such that the level is directly screwed into the horizontally extending portion without using the plate spring.

The rubber cover 70 for blocking the opening portion 45 of the lamp body 10 has a disc shape in which an opening portion 72 is formed in the central portion thereof. A hook portion 74 to be fitted into the opening-portion circumferential edge portion 46 of the lamp body 10 is circumferentially provided on the outer circumferential edge portion of the rubber cover 70, while a visor-like inner-flange portion 76 which can be put just on a visor-like outer-flange portion 50a of the socket fixture 50 is circumferentially provided on the inner circumferential edge portion of the rubber cover 70. Further, a plane portion range 47 is formed around the rearwardly projecting portion 41 on the reflector side. When the socket fixture 50 is mounted on the rearwardly projecting portion 41 of the reflector 12 (when the socket fixture 50 is bayonet-engaged with the top end portion of the projecting portion 41), the visor-like outer-flange portion 50a of the socket fixture 50 pressingly holds the visor-like inner-flange portion 76 of the rubber cover 70 against the plane portion 47 on the reflector side. Accordingly, the portion where the rubber cover 70 and the reflector 12 are joined is held tightly closed so that water or the like can never enter the lamp body 10. Further, a middle portion range 71 between the inner circumferential edge portion and the outer circumferential edge portion of the rubber cover 70 is thin and is rearwardly expanded so as to be able to flexibly follow the sliding movement of the reflector 12. Concave portions 71a and 71b (FIG. 4) are formed in the middle portion range 71 at positions where the level and the bulb are respectively provided, and hence the middle portion range 71 is shaped so as not to interfere with the level 80 mounted on the socket fixture 50 and the socket portion 64 of the bulb assembly 60 inserted into the bulb insertion hole 40.

In the above-described embodiment, if the position of the bubble 93 of the bubble vial 90 is adjusted by the adjusting screw 89 so as place the bubble at the zero point 92a on the scale, that is, if the level 80 is zero-adjusted, when the tilt of the headlamp in the up/down direction, that is, the tilt of the reflector 12 in the up/down direction, is in the proper state, the tilt of the headlamp in the up/down direction, that is, the tilt of the reflector 12 in the up/down direction, can be read from the position of the bubble 93 of the level 90 in the case where such tilt occurs. In such a case, the aiming screw 30 can be rotated so as to perform tilt adjustment of the reflector 12 about the horizontal axis $L_x$ to thereby cause the bubble 93 to be positioned at the zero point 92a of the scale.

Figure 8:
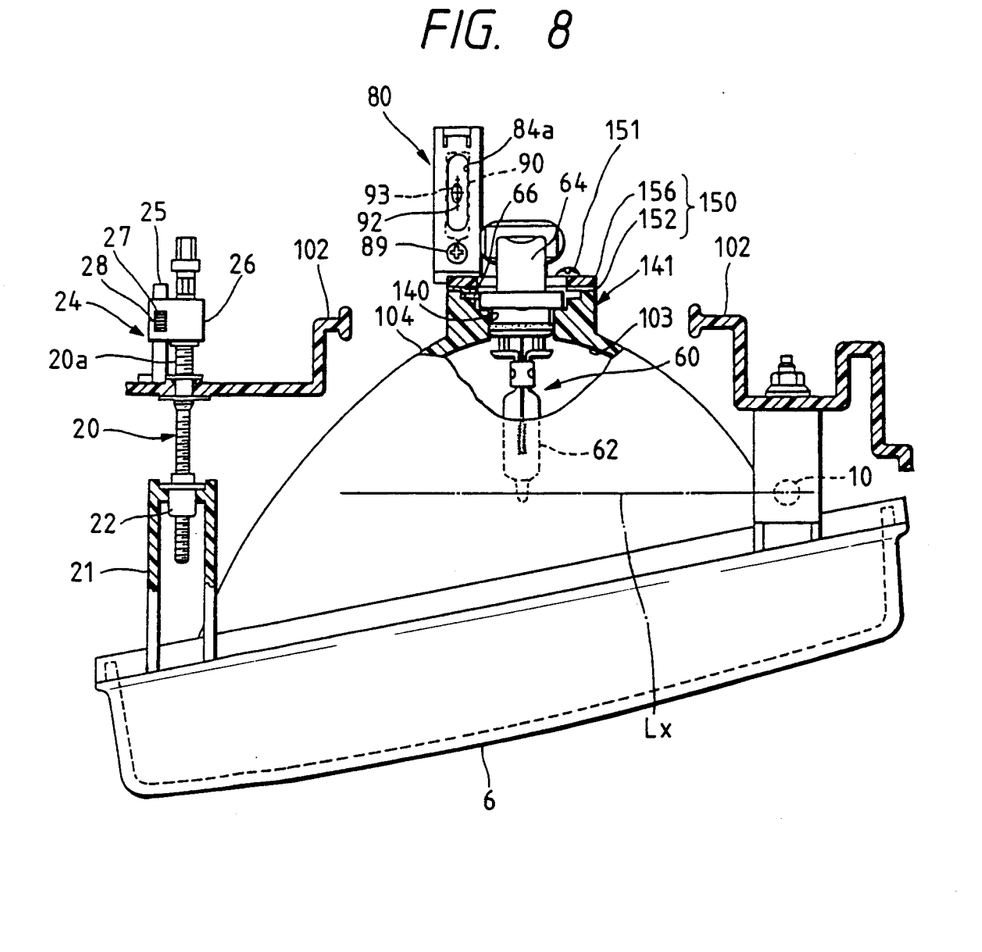
FIG. 8 is a partially broken plan view of another embodiment of a headlamp of the invention in which the invention is applied to a movable-unit type headlamp.

FIGS. 8 and 9 show another embodiment in which the present invention is applied to a movable-unit type headlamp in which the lamp housing is used as the reference member and a lamp-body reflector unit (hereinafter referred to a lamp body unit) is used as the tilting member. FIG. 8 is a partially broken plan view of the headlamp, and FIG. 9 is an exploded perspective view of the circumference of a bulb insertion hole.

In FIGS. 8 and 9, a first tilt measuring device 24 for measuring the leftward/rightward tilt of a lamp body unit 104 in which a reflector 103 is integrally formed on a lamp body at its inner circumferential surface, that is, the amount of tilt of the illumination angle of the headlamp in the left/right direction, is interposed between a lamp housing 102 and a rearwardly projecting portion 20a of a leftward/rightward aiming screw 20 projecting toward the rear side of the lamp housing 102. The tilt measuring device 24 has the same structure as the first tilt measuring device shown in the movable-reflector type headlamp described above, and hence like elements thereof are indicated by like reference numerals. Also, a further detailed description thereof will be omitted.

A bulb insertion hole 140 is formed in the lamp body unit 104 at its rear top portion, and a rearwardly projecting portion 141 is formed so as to surround the bulb insertion hole 140. Engagement concave portions 143 which are engageable with a flange-like protrusion 66 on the bulb side are formed in the rearwardly projecting portion 141 at its projecting end side on the circumferential portion of the bulb insertion hole 140. The engagement concave portions 143 is provided with a pair of projection 143a and 143b at both side thereof for accurately positioning the flange-like protrusion 66 of the bulb. A disk-like socket fixture 150 having an opening portion 150a through which the flange-like protrusions 66 on the bulb side can be removably inserted is fixed through screws on the top end surface of the rearwardly projecting portion 141. Reference numeral 151 designates fastening screws.

The socket fixture 150 is constituted by a disk-like metal plate spring 152 holding the flange-like protrusion 66 and a disk-like synthetic-resin pressing plate 156 to which a level 80 of a second tilt measuring device is attached. Stepped surfaces 153 are formed by bending one portion of the circumferential edge portion of an opening of the plate spring 152. The stepped surfaces 153 may be provided with a pair of projections at both sides thereof instead of the projections 143a and 143b of the engagement concave portions 143, for positioning the protrusion 66 of the bulb. When the socket fixture 150 is attached to the end surface of the rearwardly projecting portion 141 of the lamp body unit 104, the stepped portions 153 are made to project slightly into the inside of the respective engagement concave portions 143. That is, small gaps for elastically holding the bulb-side flange-like protrusions 66 are formed between the stepped surfaces of the plate spring 152 and the respective engagement concave portions 143. Accordingly, when the bulb is inserted into the opening portion 150a of the socket fixture and rotated clockwise, the flange-like protrusions 66 are housed in the engagement concave portions 143 in a state in which the flange-like protrusions 66 are pressed against the stepped surfaces 153 of the plate spring 152. The flange-like protrusions 66 are held elastically in the up/down direction by the spring pressure of the plate spring 152 (the stepped surfaces 153) at the engagement concave portions 143 and are positioned in the circumferential direction.

A forked horizontally extending portion 56 is integrally and projectingly formed on the front surface of the pressing plate 156 of the socket fixture 150 (at an upper portion in FIG. 9). The level 80 of the second tilt measuring device for measuring the tilt of the lamp body unit 104 in the up/down direction is attached to the horizontally extending portion 56. The structure of the second tilt measuring device 80 is also the same as the second tilt measuring device of the above-described movable-reflector type headlamp. Accordingly, like reference numerals indicate like elements in the drawings, and a further detailed description thereof will be omitted.

Although the socket fixture 150 is constituted by the plate spring 152 and the pressing plate 156 in the embodiment shown in FIGS. 8 and 9, the socket fixture may be constituted by a single synthetic-resin plate. Other shapes of the socket fixture may also be used, for example, as disclosed in U.S. Pat. No. 4,760,506. Further, other considerable and useful arrangement may be applied to the embodiment described above. For example, an error-assembling prevention means may be arranged to at least one of the metal plate spring 152, projecting plate 156 and rearwardly projecting portion 141 in order to prevent these members from being erroneously (reversely) mounted with one another while assembling.

As is apparent from the above description, in the automobile headlamp according to the present invention wherein the level for measuring the tilt of the illumination angle of the headlamp in the up/down direction is attached to the horizontally extending portion of the socket fixture attached in the bulb insertion hole so as to extend toward the back of the lamp, the conventionally required level-mounting space on the upper portion of the headlamp is unnecessary, and the height of lamp in the up/down direction is reduced. Accordingly, the headlamp can easily be made thin.

Further, because the socket fixture to which the level is attached is a part independent of and separate from the bulb, it is unnecessary to discard the socket fixture and the level together with the bulb when the bulb is replaced. Accordingly, the cost of replacing the bulb is reduced.

What is claimed is:

1. An automobile headlamp in which an illumination angle of said headlamp can be adjusted by tilting a tilting member in which a bulb is mounted in the up/down direction and in the left/right direction with respect to a reference member, comprising: a bulb socket assembly; a socket fixture for removably holding said bulb socket assembly, said socket fixture being attached to a bulb insertion member of said tilting member; a plate-like rearwardly projecting horizontally extending portion formed on said socket fixture; and a level for measuring an amount of tilt of said tilting member in the up/down direction attached to said horizontally extending portion.

2. The automobile headlamp according to claim 1, wherein said reference member is a lamp body and said tilting member is a reflector tiltably mounted in said lamp body.

3. The automobile headlamp according to claim 1, wherein said reference member is a lamp housing, and said tilting member is a lamp body reflector unit with a reflector integrally formed on an inner circumferential surface of said unit.

4. The automobile headlamp according to claim 1, wherein said bulb insertion member comprises a hollow generally cylindrical protrusion extending rearwardly from said tilting member having horizontal engagement protrusions for making bayonet-type engagement with said socket fixture.

5. The automobile headlamp according to claim 4, wherein said socket fixture comprises a flanged hat-shaped body having a generally triangular opening therein and horizontal ribs engageable with said horizontal engagement protrusions of said bulb insertion member.

6. The automobile headlamp according to claim 5, wherein engagement concave portions are formed in an end surface of said bulb insertion member, wherein said socket fixture comprises a plurality of belt-like ribs extending in a circumferential direction of said socket fixture, and wherein said bulb socket assembly comprises a plurality of flange-like protrusions received in said engagement concave portions and held between said engagement concave portions and said belt-like ribs of said socket fixture.

7. The automobile headlamp according to claim 1, wherein said level comprises an upwardly opening rectangular vessel-like casing, a cover body attached to an open side of said casing, and a bubble vial suspended from said cover body.

8. The automobile headlamp according to claim 7, wherein said cover body comprises a plurality of hook-like sandwiching members for suspending said bubble vial from said cover body with an air layer formed between said casing and said bubble vial.

9. The automobile headlamp according to claim 7, said cover body is attached to said casing through lance coupling means by an adjusting screw.

10. The automobile headlamp according to claim 1, further comprising a plate spring for attaching said level to said horizontally extending portion formed on said socket fixture.

11. The automobile headlamp according to claim 7, wherein said horizontally extending portion comprises a forked portion, and said casing comprises a leg portion slidably inserted into said forked portion.

12. The automobile headlamp according to claim 11, further comprising a plate spring and a fixing plate attached to said leg portion by screws, said forked portion being sandwiched between said level and said fixing plate with said plate spring being disposed between said fixing plate and said forked portion.

13. The automobile headlamp according to claim 1, further comprising a rubber cover disposed around said bulb insertion member.

* * * * *